(12) United States Patent
Harrison

(10) Patent No.: US 11,962,253 B2
(45) Date of Patent: Apr. 16, 2024

(54) MICROINVERTER FOR USE WITH RENEWABLE ENERGY SYSTEM

(71) Applicant: Enphase Energy, Inc., Petaluma, CA (US)

(72) Inventor: Michael J. Harrison, Petaluma, CA (US)

(73) Assignee: Enphase Energy, Inc., Petaluma, CA (US)

(*) Notice: Subject to any disclaimer, the term of this patent is extended or adjusted under 35 U.S.C. 154(b) by 62 days.

(21) Appl. No.: 17/983,882

(22) Filed: Nov. 9, 2022

(65) Prior Publication Data

US 2023/0179118 A1    Jun. 8, 2023

Related U.S. Application Data

(60) Provisional application No. 63/287,326, filed on Dec. 8, 2021.

(51) Int. Cl.
*H02M 7/5387* (2007.01)
*H02J 3/38* (2006.01)
*H02J 3/32* (2006.01)
*H02M 5/293* (2006.01)

(52) U.S. Cl.
CPC ........... *H02M 7/5387* (2013.01); *H02J 3/381* (2013.01); *H02J 3/32* (2013.01); *H02J 2300/20* (2020.01); *H02M 5/293* (2013.01)

(58) Field of Classification Search
CPC ........ H02M 7/5387; H02M 5/293; H02J 3/38; H02J 3/381; H02J 2300/20; H02J 3/32
See application file for complete search history.

(56) References Cited

U.S. PATENT DOCUMENTS

| | | | |
|---|---|---|---|
| 7,920,393 B2 | 4/2011 | Bender et al. | |
| 8,222,767 B2 | 7/2012 | Fornage | |
| 9,270,201 B1 | 2/2016 | Potharaju | |
| 2011/0267857 A1* | 11/2011 | Fornage | ............ H02M 7/53871 363/97 |

FOREIGN PATENT DOCUMENTS

| | | |
|---|---|---|
| CN | 113054635 A | 6/2021 |
| KR | 10-1644522 B1 | 8/2016 |
| KR | 10-2021-0086580 A | 7/2021 |
| TW | 201403989 A | 1/2014 |

OTHER PUBLICATIONS

PCT Search Report and Written Opinion for Application No. PCT/US2022/049882 dated Apr. 3, 2023, 10 pgs.

* cited by examiner

*Primary Examiner* — Robert L Deberadinis
(74) *Attorney, Agent, or Firm* — MOSER TABOA

(57) ABSTRACT

A microinverter inverter is provided and comprises an output comprising a four-way connector comprising three power input/output connecters and a voltage monitoring and power line communications connector. The output is configured to connect to an AC cable comprising a rotatable four-way connector comprising three phase wires and a neutral wire which allows the microinverter to operate in at least one of a three-phase grid-tied mode of operation, a three-phase off-grid neutral-forming mode of operation, a two-phase grid-tied mode of operation, a two-phase off-grid neutral-forming mode of operation, or a split-phase and single-phase grid tied and off-grid neutral-forming mode of operation when the microinverter is connected to the AC cable.

11 Claims, 2 Drawing Sheets understood# MICROINVERTER FOR USE WITH RENEWABLE ENERGY SYSTEM

CROSS-REFERENCE TO RELATED APPLICATIONS

The present application claims the benefit of and priority to U.S. Provisional Application Ser. No. 63/287,326, filed on Dec. 8, 2021, the entire contents of which is incorporated herein by reference.

BACKGROUND

Field

Embodiments of the present disclosure generally relate to microinverters, and more particularly, to neutral forming microinverters.

Description of the Related Art

Solar cells and other renewable energy sources generate a DC current which is then fed through an inverter that converts the DC current into an AC current that can be used to provide power. For renewable energy systems operating in an off-grid mode, the inverter needs to provide the AC neutral point. Based on the intended use, a different microinverter design may be used to convert the renewable DC current into either North American domestic split-phase (120/240Vac) systems and also for three-phase renewable energy systems (120/208Vac & 277/480Vac North American, and 230/400Vac rest of world systems).

Therefore, there is a need in the art to create a microinverter design able to create an AC neutral for both North American domestic split-phase systems and also for three-phase renewable energy systems.

SUMMARY

In accordance with at least some embodiments of the present disclosure, there is provided a microinverter inverter that comprises an output comprising a four-way connector comprising three power input/output connecters and a voltage monitoring and power line communications connector. The output is configured to connect to an AC cable comprising a rotatable four-way connector comprising three phase wires and a neutral wire which allows the microinverter to operate in at least one of a three-phase grid-tied mode of operation, a three-phase off-grid neutral-forming mode of operation, a two-phase grid-tied mode of operation, a two-phase off-grid neutral-forming mode of operation, or a split-phase and single-phase grid tied and off-grid neutral-forming mode of operation when the microinverter is connected to the AC cable.

In accordance with at least some embodiments of the present disclosure, there is provided a system that comprises a microinverter comprising an output comprising a four-way connector comprising three power input/output connecters and a voltage monitoring. A power line communications connector and an AC cable configured to connect to the four-way connector and comprising a rotatable four-way connector comprising three phase wires and a neutral wire which allows the microinverter to operate in at least one of a three-phase grid-tied mode of operation, a three-phase off-grid neutral-forming mode of operation, a two-phase grid-tied mode of operation, a two-phase off-grid neutral-forming mode of operation, or a split-phase and single-phase grid tied and off-grid neutral-forming mode of operation when the microinverter is connected to the AC cable.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments of the present disclosure relate to methods and apparatus that provide a universal neutral forming AC battery microinverter. For example, in at least some embodiments, a microinverter comprises an output comprising a four-way connector comprising three power input/output connecters and a voltage monitoring and power line communications connector. The output is configured to connect to an AC cable comprising a rotatable four-way connector comprising three phase wires and a neutral wire which allows the microinverter to operate in at least one of a three-phase grid-tied mode of operation, a three-phase off-grid neutral-forming mode of operation, a two-phase grid-tied mode of operation, a two-phase off-grid neutral-forming mode of operation, or a split-phase and single-phase grid tied and off-grid neutral-forming mode of operation when the microinverter is connected to the AC cable.

A universal neutral forming AC battery microinverter described herein provides minimal design redundancy. The main redundancy is the superfluous formation of a neutral voltage for a single-phase grid-tied application that does not require the neutral-forming function. Additionally, there is design redundancy in that only the three-phase neutral-forming configuration requires the three-phase wires in the cable being transposed between each of the connectors and the 4-way connector. Additional embodiments do not require a phase wire transpose or the use of a 4-way connector (e.g., 3-way would be suitable for three-phase grid-tied and split-phase, 2-way would be suitable for single-phase). Accordingly, the design redundancy provides a single design that is capable of being used to cover all possible system configurations and, therefore, can maximize a total business profit. Moreover, the embodiments of the cable described herein do not preclude a range of various cable designs for corresponding various system configurations. Each of the unique cable designs could be cost optimized (e.g., have a required number of cable wires—2, 3, or 4) and the 4-way connectors can be keyed to remove the option to plug the connector on an AC battery inverter in two different orientations (e.g., rotated 180°).

Figure 1:
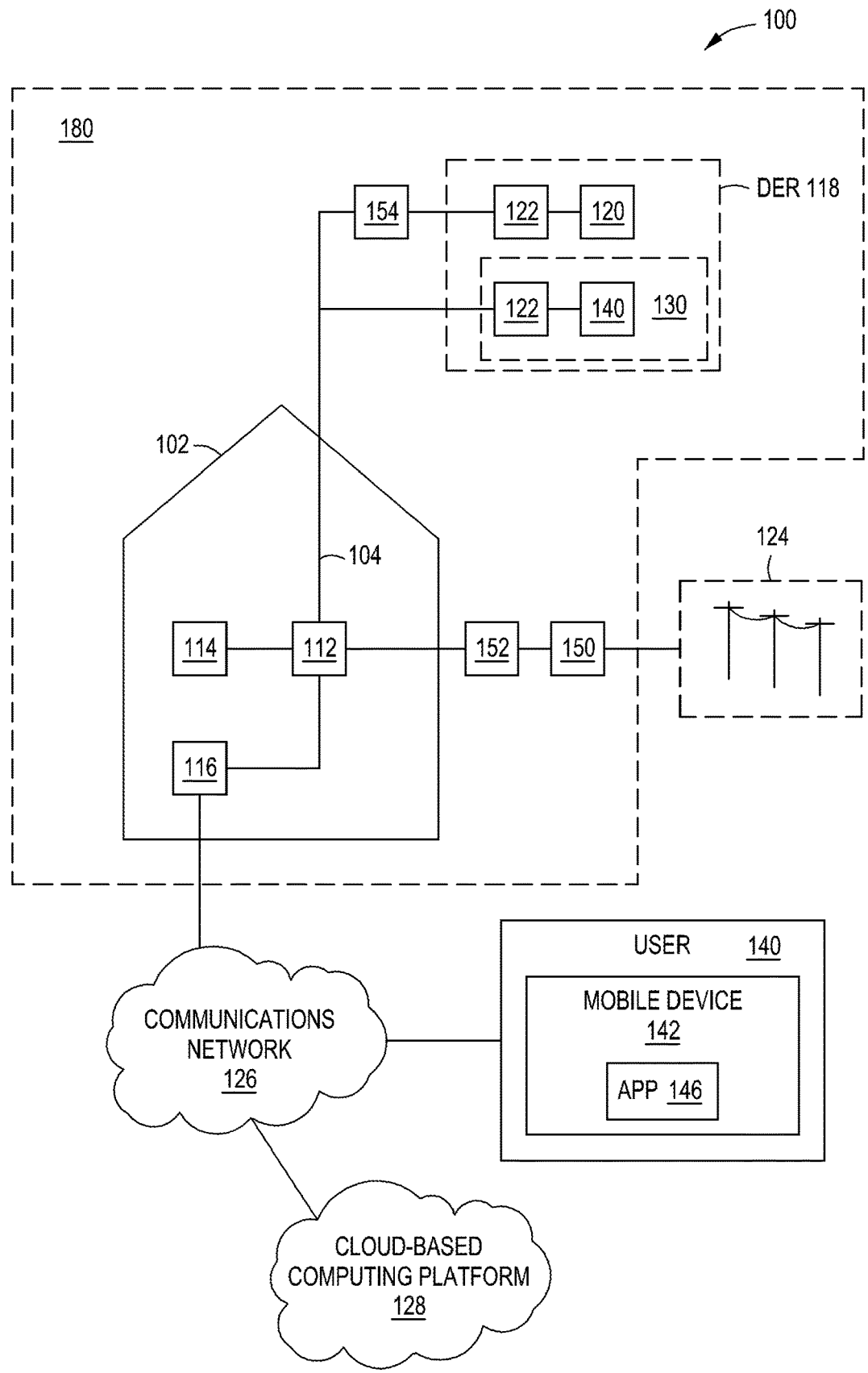
FIG. 1 is a block diagram of a system in accordance with one or more embodiments of the present disclosure.

FIG. 1 is a block diagram of a system 100 (e.g., power conversion system-renewable energy system) in accordance with one or more embodiments of the present disclosure. The diagram of FIG. 1 only portrays one variation of the myriad of possible system configurations. The present disclosure can function in a variety of environments and systems.

The system 100 comprises a structure 102 (e.g., a user's structure), such as a residential home or commercial building, having an associated DER 118 (distributed energy resource). The DER 118 is situated external to the structure 102. For example, the DER 118 may be located on the roof of the structure 102 or can be part of a solar farm. The structure 102 comprises one or more loads and/or energy storage devices 114 (e.g., appliances, electric hot water heaters, thermostats/detectors, boilers, water pumps, and the like), which can be located within or outside the structure 102, and a DER controller 116, each coupled to a load center 112. Although the energy storage devices 114, the DER controller 116, and the load center 112 are depicted as being located within the structure 102, one or more of these may be located external to the structure 102.

The load center 112 is coupled to the DER 118 by an AC bus 104 and is further coupled, via a meter 152 and a MID 150 (microgrid interconnect device), to a grid 124 (e.g., a commercial/utility power grid). The structure 102, the energy storage devices 114, DER controller 116, DER 118, load center 112, generation meter 154, meter 152, and MID 150 are part of a microgrid 180. It should be noted that one or more additional devices not shown in FIG. 1 may be part of the microgrid 180. For example, a power meter or similar device may be coupled to the load center 112.

The DER 118 comprises at least one renewable energy source (RES) coupled to power conditioners 122 (e.g., power converter such as an AC battery microinverter). For example, the DER 118 may comprise a plurality of RESs 120 coupled to a plurality of power conditioners 122 in a one-to-one correspondence (or two-to-one). In embodiments described herein, each RES of the plurality of RESs 120 is a photovoltaic module (PV module), although in other embodiments the plurality of RESs 120 may be any type of system for generating DC power from a renewable form of energy, such as wind, hydro, and the like. The DER 118 may further comprise one or more batteries (or other types of energy storage/delivery devices) coupled to the power conditioners 122 in a one-to-one correspondence, where each pair of power conditioner 122 and a corresponding battery 141 may be referred to as an AC battery 130.

The power conditioners 122 invert the generated DC power from the plurality of RESs 120 and/or the battery 141 to AC power that is grid-compliant and couple the generated AC power to the grid 124 via the load center 112. The generated AC power may be additionally or alternatively coupled via the load center 112 to the one or more loads and/or the energy storage devices 114. In addition, the power conditioners 122 that are coupled to the batteries 141 convert AC power from the AC bus 104 to DC power for charging the batteries 141. A generation meter 154 is coupled at the output of the power conditioners 122 that are coupled to the plurality of RESs 120 in order to measure generated power.

In some alternative embodiments, the power conditioners 122 may be AC-AC converters that receive AC input and convert one type of AC power to another type of AC power. In other alternative embodiments, the power conditioners 122 may be DC-DC converters that convert one type of DC power to another type of DC power. In some of embodiments, the DC-DC converters may be coupled to a main DC-AC inverter for inverting the generated DC output to an AC output.

The power conditioners 122 may communicate with one another and with the DER controller 116 using power line communication (PLC), although additionally and/or alternatively other types of wired and/or wireless communication may be used. The DER controller 116 may provide operative control of the DER 118 and/or receive data or information from the DER 118. For example, the DER controller 116 may be a gateway that receives data (e.g., alarms, messages, operating data, performance data, and the like) from the power conditioners 122 and communicates the data and/or other information via the communications network 126 to a cloud-based computing platform 128, which can be configured to execute one or more application software, e.g., a grid connectivity control application, to a remote device or system such as a master controller (not shown), and the like. The DER controller 116 may also send control signals to the power conditioners 122, such as control signals generated by the DER controller 116 or received from a remote device or the cloud-based computing platform 128. The DER controller 116 may be communicably coupled to the communications network 126 via wired and/or wireless techniques. For example, the DER controller 116 may be wirelessly coupled to the communications network 126 via a commercially available router. In one or more embodiments, the DER controller 116 comprises an application-specific integrated circuit (ASIC) or microprocessor along with suitable software (e.g., a grid connectivity control application) for performing one or more of the functions described herein. For example, the DER controller 116 can include a memory (e.g., a non-transitory computer readable storage medium) having stored thereon instructions that when executed by a processor perform a method for grid connectivity control, as described in greater detail below.

The generation meter 154 (which may also be referred to as a production meter) may be any suitable energy meter that measures the energy generated by the DER 118 (e.g., by the power conditioners 122 coupled to the plurality of RESs 120). The generation meter 154 measures real power flow (kWh) and, in some embodiments, reactive power flow (kVAR). The generation meter 154 may communicate the measured values to the DER controller 116, for example using PLC, other types of wired communications, or wireless communication. Additionally, battery charge/discharge values are received through other networking protocols from the AC battery 130 itself.

The meter 152 may be any suitable energy meter that measures the energy consumed by the microgrid 180, such as a net-metering meter, a bi-directional meter that measures energy imported from the grid 124 and well as energy exported to the grid 124, a dual meter comprising two separate meters for measuring energy ingress and egress, and the like. In some embodiments, the meter 152 comprises the MID 150 or a portion thereof. The meter 152 measures one or more of real power flow (kWh), reactive power flow (kVAR), grid frequency, and grid voltage.

The MID 150, which may also be referred to as an island interconnect device (IID), connects/disconnects the microgrid 180 to/from the grid 124. The MID 150 comprises a disconnect component (e.g., a contactor or the like) for physically connecting/disconnecting the microgrid 180 to/from the grid 124. For example, the DER controller 116 receives information regarding the present state of the system from the power conditioners 122, and also receives the energy consumption values of the microgrid 180 from the meter 152 (for example via one or more of PLC, other types of wired communication, and wireless communication), and based on the received information (inputs), the DER controller 116 determines when to go on-grid or off-grid and instructs the MID 150 accordingly. In some alternative embodiments, the MID 150 comprises an ASIC or CPU, along with suitable software (e.g., an islanding module) for determining when to disconnect from/connect to the grid 124. For example, the MID 150 may monitor the grid 124 and detect a grid fluctuation, disturbance or outage and, as a result, disconnect the microgrid 180 from the grid 124. Once disconnected from the grid 124, the microgrid 180 can continue to generate power as an intentional island without imposing safety risks, for example on any line workers that may be working on the grid 124.

In some alternative embodiments, the MID 150 or a portion of the MID 150 is part of the DER controller 116. For example, the DER controller 116 may comprise a CPU and an islanding module for monitoring the grid 124, detecting grid failures and disturbances, determining when to disconnect from/connect to the grid 124, and driving a disconnect component accordingly, where the disconnect component may be part of the DER controller 116 or, alternatively, separate from the DER controller 116. In some embodiments, the MID 150 may communicate with the DER controller 116 (e.g., using wired techniques such as power line communications, or using wireless communication) for coordinating connection/disconnection to the grid 124.

A user 140 can use one or more computing devices, such as a mobile device 142 (e.g., a smart phone, tablet, or the like) communicably coupled by wireless means to the communications network 126. The mobile device 142 has a CPU, support circuits, and memory, and has one or more applications, such as an application 146 (e.g., a grid connectivity control application) installed thereon for controlling the connectivity with the grid 124 as described herein. The application 146 may run on commercially available operating systems, such as 1OS, ANDROID, and the like.

In order to control connectivity with the grid 124, the user 140 interacts with an icon displayed on the mobile device 142, for example a grid on-off toggle control or slide, which is referred to herein as a toggle button. The toggle button may be presented on one or more status screens pertaining to the microgrid 180, such as a live status screen (not shown), for various validations, checks and alerts. The first time the user 140 interacts with the toggle button, the user 140 is taken to a consent page, such as a grid connectivity consent page, under setting and will be allowed to interact with toggle button only after he/she gives consent.

Once consent is received, the scenarios below, listed in order of priority, will be handled differently. Based on the desired action as entered by the user 140, the corresponding instructions are communicated to the DER controller 116 via the communications network 126 using any suitable protocol, such as HTTP(S), MQTT(S), WebSockets, and the like. The DER controller 116, which may store the received instructions as needed, instructs the MID 150 to connect to or disconnect from the grid 124 as appropriate.

Figure 2:
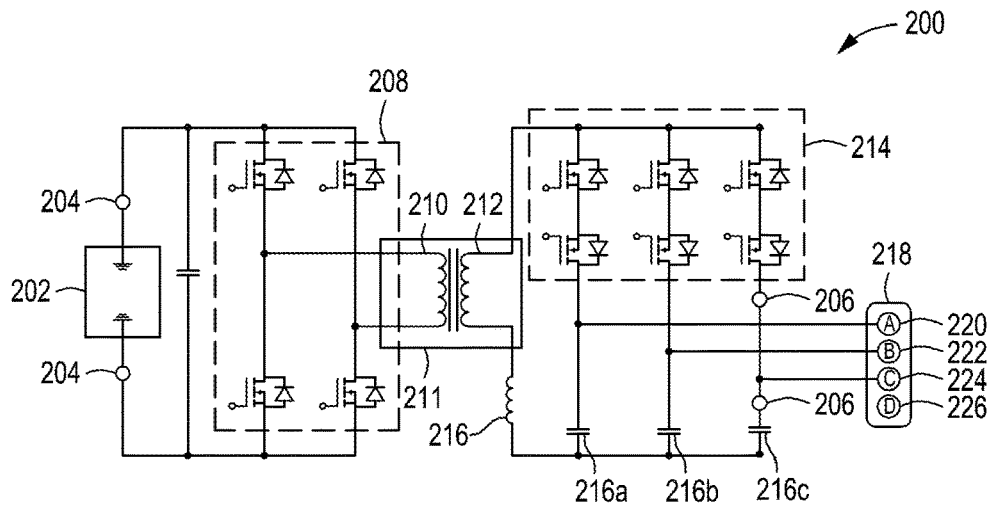
FIG. 2 is a schematic diagram of an AC battery microinverter in accordance with one or more embodiments of the present disclosure.

FIG. 2 is a schematic diagram of an AC battery microinverter 200 (e.g., the power conditioner 122) in accordance with one or more embodiments of the present disclosure. One or more DC sources 202 are coupled across a pair of DC ports 204 of the AC battery microinverter 200 and a single-phase AC line (e.g., an AC grid) is coupled across AC ports 206 of the AC battery microinverter 200. As noted above, in some embodiments the AC battery microinverter 200 may be a DC-AC inverter that converters DC input from the DC source 202 to an AC output that is coupled to the AC line. Alternatively or additionally, the DC source 202 may store energy (e.g., the DC source 202 may be a rechargeable battery) and the AC battery microinverter 200 converts an AC input from an AC line to a DC output at the DC ports 204. In some alternative embodiments, the DC source 202 can be replaced by a DC load and the AC battery microinverter 200 converts AC input from the AC line to a DC output that is delivered to the DC load.

The AC battery microinverter 200 comprises a DC bridge 208 (e.g., a full H-bridge) coupled across a DC side winding 210 of a transformer 211. The AC battery microinverter 200 comprises a cycloconverter 214 having a first side coupled to the AC side winding 212 of the transformer 211 (e.g., via a capacitor (not shown)). On a second side of the cycloconverter 214, each of the cycloconverter's 214 three legs are coupled to a line cycle energy storage. Additionally, an inductor 216 is coupled between a terminal of the AC side winding 212 and a plurality of energy storage capacitors 216a-216c are coupled to each of the cycloconverter's 214 three legs.

In accordance with the present disclosure, the AC battery microinverter 200 is configured in two voltage variants. For example, in at least some embodiments, a variant A, which can be used in North America, is configured for (60 Hz) 120/240Vac split-phase and 120/208Vac three-phase applications, as well as (50 Hz) 230Vac and 240Vac single-phase applications, which can be used in Europe. A variant B, which can also be used in North America, can be configured for (60 Hz) 277/480Vac three-phase applications, as well as (50 Hz) 230/400Vac and 240/415Vac three-phase applications, which can be used in Europe. Both variants A and B of the AC battery microinverter 200 are configured to support both grid-tied and off-grid (grid forming+neutral forming) applications. That is, both variants A and B are capable of operating in the following different power conversion modes: i) as a balanced 120° three-phase converter (both grid-tied mode of operation or off-grid neutral mode of operation); ii) as a balanced 120° two-phase converter (both grid-tied mode of operation or off-grid neutral mode of operation); iii) as a balanced 180° split-phase converter (both grid-tied mode of operation or off-grid neutral mode of operation).

Both variants A and B of the AC battery microinverter 200 are configured for use with a 4-way AC connector that includes three AC power input/output connections and a fourth connector that, in some embodiments, serves voltage monitoring and PLC purposes and is not connected for power conversion purposes. For example, continuing with reference to FIG. 2, the AC battery microinverter 200 contains a four-way AC connector 218 with a first AC power input/output connection 220, a second AC power input/output connection 222, a third AC power input/output connection 224, and a neutral connection 226.

Additionally, the inventors have developed an AC cable that features multiple four-way connectors (rotatable four-way connector) that mate with the four-way AC connector 218 on the AC battery microinverter 200. For example, three phase wires in the AC cable are transposed between each of the first AC power input/output connection 220, the second AC power input/output connection 222, the third AC power input/output connection 224, while a fourth neutral wire connects to the same pin on the four-way AC connector 218. The multiple four-way connectors on the AC cable are symmetrical and not keyed, thus allowing for the multiple four-way connectors to be plugged into the AC battery microinverter 200 (e.g., for both variants A and B) in two different ways (e.g., 180 degrees of rotational symmetry). For example, in a first connection configuration, the AC cable provides a system configuration for grid-tied applications (e.g., without neutral forming), and in a second configuration (e.g., rotating the AC connector by 180 degrees) provides a system configuration for off-grid applications that require a neutral forming function. The AC cable connectors and the AC battery microinverter 200 feature corresponding markings or other visual indicia that facilitates a system installer in determining which way (e.g., correct orientation) the multiple 4-way connectors on the AC cable are to be plugged into the AC battery microinverter 200.

Figure 3:
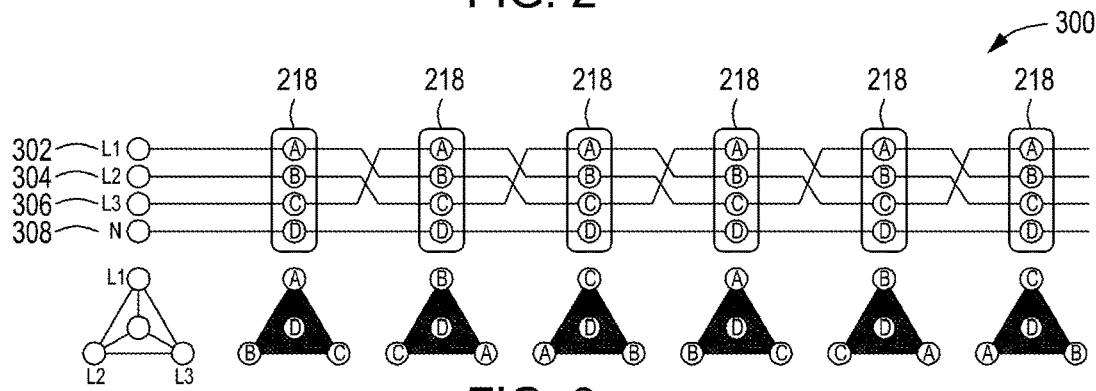
FIG. 3 is a diagram of a three-phase grid-tied application in accordance with one or more embodiments of the present disclosure.

For example, FIG. 3 is a diagram of a three-phase grid-tied application 300 in accordance with one or more embodiments of the present disclosure. As illustrated in FIG. 3, the multiple 4-way connectors on the AC cable comprise three phase wires 302, 304, 306 ($L_1$, $L_2$, $L_3$) connect to three corresponding AC power input/output connections A, B, C (e.g., the first AC power input/output connection 220, the second AC power input/output connection 222, the third AC power input/output connection 224) of each connected AC battery microinverter (e.g., variants A and/or B). A cable neutral wire 308 (N) connects to the neutral connection D (e.g., neutral connection 226). Accordingly, each AC battery microinverter 200 connected operates as a balanced three-phase converter.

Figure 4:
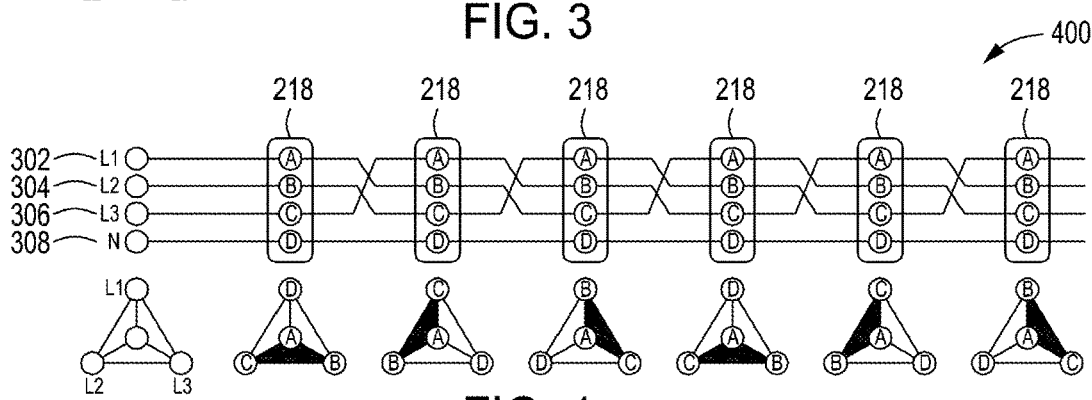
FIG. 4 is a diagram of a three-phase off-grid neutral forming application in accordance with one or more embodiments of the present disclosure.

FIG. 4 is a diagram of a three-phase off-grid neutral forming application 400 in accordance with one or more embodiments of the present disclosure. Unlike the configuration of FIG. 3, the four-way AC connector 218 on each AC battery microinverter 200 is rotated 180° such that the first AC power input/output connection 220 (A) is coupled to the cable neutral wire 308 and the second AC power input/output connection 222 (B), the third AC power input/output connection 224 (C), and the neutral connection 226 (D) are coupled to the three phase wires (306, 304, 302), respectively, which translate between each of the cable connections. Accordingly, each AC battery microinverter 200 connected operates as a balanced two-phase converter.

Figure 5:
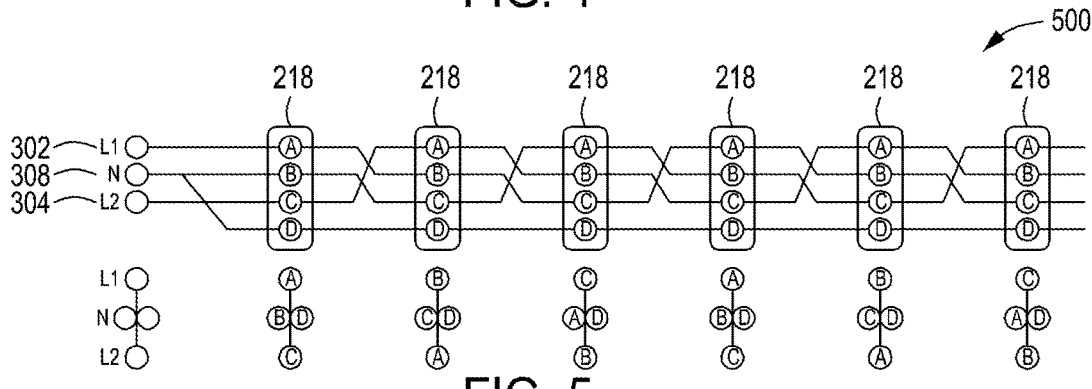
FIG. 5 is a diagram of a split-phase and single-phase grid-tied and off-grid neutral forming application in accordance with one or more embodiments of the present disclosure.

FIG. 5 is a diagram of a split-phase and single-phase grid-tied and off-grid neutral forming application 500 in accordance with one or more embodiments of the present disclosure. For example, as illustrated by 510 the first AC power input/output connection 220 (A) and the third AC power input/output connection 224 (C) of the AC battery microinverter 200 connects to the cable phase wires 302 and 304 and the second AC power input/output connection 222 (B) and the neutral connection 226 (D) of each AC battery microinverter 200 connects to the cable neutral wire 308 (the 4-way cable connectors are orientated the same way as they are for the three-phase grid-tied configuration).

While the embodiments of the connector and cable configurations have been described in terms of use with AC battery microinverters, the present disclosure is not so limited. For example, in at least some embodiments, the connectors and cable configurations can also be configured for use with PV microinverters.

While the foregoing is directed to embodiments of the present disclosure, other and further embodiments of the disclosure may be devised without departing from the basic scope thereof, and the scope thereof is determined by the claims that follow.

The invention claimed is:

1. A microinverter inverter, comprising:
an output comprising a four-way connector comprising three power input/output connecters and a voltage monitoring and power line communications connector, wherein the output is configured to connect to an AC cable comprising a rotatable four-way connector comprising three phase wires and a neutral wire which allows the microinverter to operate in at least one of a three-phase grid-tied mode of operation, a three-phase off-grid neutral-forming mode of operation, a two-phase grid-tied mode of operation, a two-phase off-grid neutral-forming mode of operation, or a split-phase and single-phase grid tied and off-grid neutral-forming mode of operation when the microinverter is connected to the AC cable.

2. The microinverter of claim 1, wherein the microinverter is configured for use with at least one of 60 Hz 120/240 Vac split-phase applications, 60 Hz 120/208 Vac three-phase applications, 60 Hz 277/480 Vac three-phase applications, 50 Hz 230/240 Vac single-phase applications, 50 Hz 230/400 Vac three-phase applications, or 240/415 Vac three-phase applications.

3. The microinverter of claim 1, wherein the four-way connector comprises markings that are configured to align with corresponding markings on the AC cable to facilitate plugging the AC cable in a correct orientation into the four-way connector.

4. A system, comprising:
a microinverter comprising an output comprising a four-way connector comprising three power input/output connecters and a voltage monitoring and power line communications connector; and
an AC cable configured to connect to the four-way connector and comprising a rotatable four-way connector comprising three phase wires and a neutral wire which allows the microinverter to operate in at least one of a three-phase grid-tied mode of operation, a three-phase off-grid neutral-forming mode of operation, a two-phase grid-tied mode of operation, a two-phase off-grid neutral-forming mode of operation, or a split-phase and single-phase grid tied and off-grid neutral-forming mode of operation when the microinverter is connected to the AC cable.

5. The system of claim 4, wherein the microinverter is configured for use with at least one of 60 Hz 120/240 Vac split-phase applications, 60 Hz 120/208 Vac three-phase applications, 60 Hz 277/480 Vac three-phase applications, 50 Hz 230/240 Vac single-phase applications, 50 Hz 230/400 Vac three-phase applications, or 240/415 Vac three-phase applications.

6. The system of claim 4, wherein the four-way connector comprises markings that are configured to align with corresponding markings on the AC cable to facilitate plugging the AC cable in a correct orientation into the four-way connector.

7. The system of claim 4, wherein the rotatable four-way connector is rotatable between a first connection configuration and a second connection configuration different from the first connection configuration.

8. The system of claim 7, wherein the rotatable four-way connector is rotatable 180 degrees such that in the first connection configuration the microinverter is configured for the grid-tied mode of operation and in the second connection configuration the microinverter is configured for the off-grid neutral-forming mode of operation.

9. The system of claim 4, wherein connectors on the rotatable four-way connector are symmetrical and not keyed to allow the connectors to be transposed between the three power input/output connecters and the voltage monitoring and power line communications connector on the four-way connector of the output.

10. The system of claim 4, wherein when the microinverter operates in the three-phase grid-tied mode of operation or the two-phase grid-tied mode of operation, the three phase wires on the AC cable connect to the three power input/output connecters and the neutral wire on the AC cable connects to the voltage monitoring and power line communications connector, and when the microinverter operates in the three-phase off-grid neutral-forming mode of operation, the three phase wires on the AC cable connect to two of the three power input/output connecters and the voltage monitoring and power line communications connector and the neutral wire on the AC cable connects to a remaining input/output connecter.

11. The system of claim 4, wherein when the microinverter operates in the split-phase and single-phase grid tied and off-grid neutral-forming mode of operation, two of the three phase wires on the AC cable connect respectively to one of the three power input/output connecters and the voltage monitoring and power line communications connector and the neutral wire on the AC cable connects to a remaining two of the three phase wires on the AC cable.

\* \* \* \* \*